United States Patent [19]

Shang et al.

[11] 3,821,660

[45] June 28, 1974

[54] APPARATUS FOR IRRADIATION OF LASER CAVITY

[75] Inventors: Jer-Yu Shang, Wilmington, Del.; William B. Hansel, Media, Pa.

[73] Assignee: Sun Research and Development Co., Philadelphia, Pa.

[22] Filed: June 12, 1972

[21] Appl. No.: 261,764

Related U.S. Application Data

[63] Continuation-in-part of Ser. No. 3,964, Jan. 19, 1970, abandoned.

[52] U.S. Cl.................. 331/94.5, 330/4.3, 23/252 R
[51] Int. Cl............................................. H01s 3/09
[58] Field of Search............... 331/94.5; 330/4.3; 23/252 R

[56] References Cited
UNITED STATES PATENTS

| | | | |
|---|---|---|---|
| 3,414,838 | 12/1968 | DeMent | 331/94.5 |
| 3,564,453 | 2/1971 | Wieder | 331/94.5 |

OTHER PUBLICATIONS

Stokes et al., Tech. Report Announced in U.S. Govt. Res. & Devel. Reports, 69, (5), March 10, 1969, p. 156.

*Primary Examiner*—David Schonberg
*Assistant Examiner*—R. J. Webster
*Attorney, Agent, or Firm*—George L. Church, Esq.; J. Edward Hess, Esq.; Barry A. Bisson, Esq.

[57] ABSTRACT

A system for the irradiation of a target with electromagnetic energies covering the region between approximately the infra-X-ray and the trans-infrared portions of the spectrum comprises: light associated with a shock wave front aligned to strike a tape valve comprising a movable tape, impervious to said shock wave, having a mirror-like surface and also at least one aperture in spaced relation to said surface and means for moving said tape at a speed such that said light strikes the mirror-like surface and said shock wave front passes through said aperture; a shock sensitive irradiable target optically coupled to said mirror-like surface and said movable member, whereby to provide via said movable member a light-coupling between said target and light source.

8 Claims, 6 Drawing Figures

PATENTED JUN 28 1974 3,821,660
SHEET 1 OF 3
LASER FROM INTERNAL COMBUSTION ENGINE
FIGURE 1
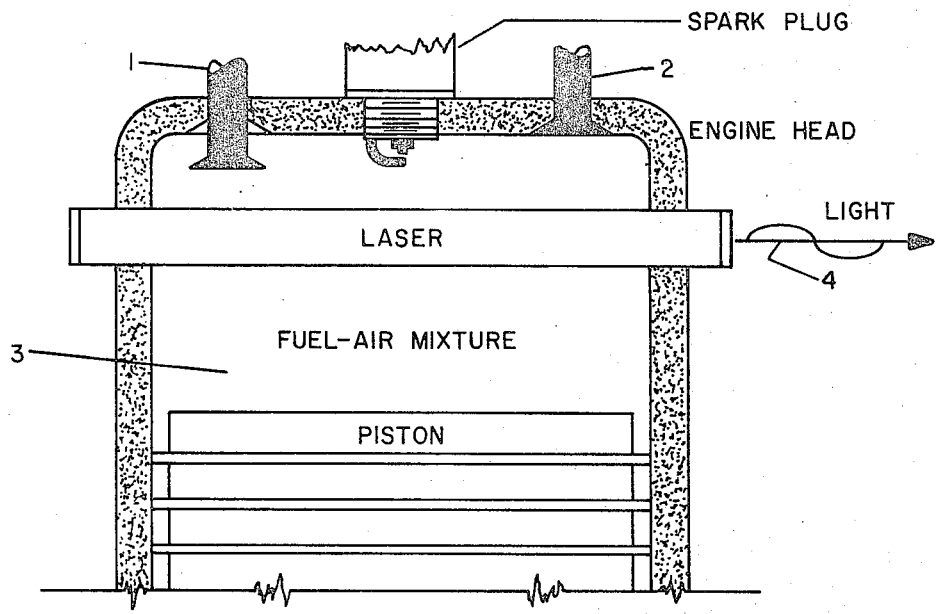
WAVE DIAGRAM
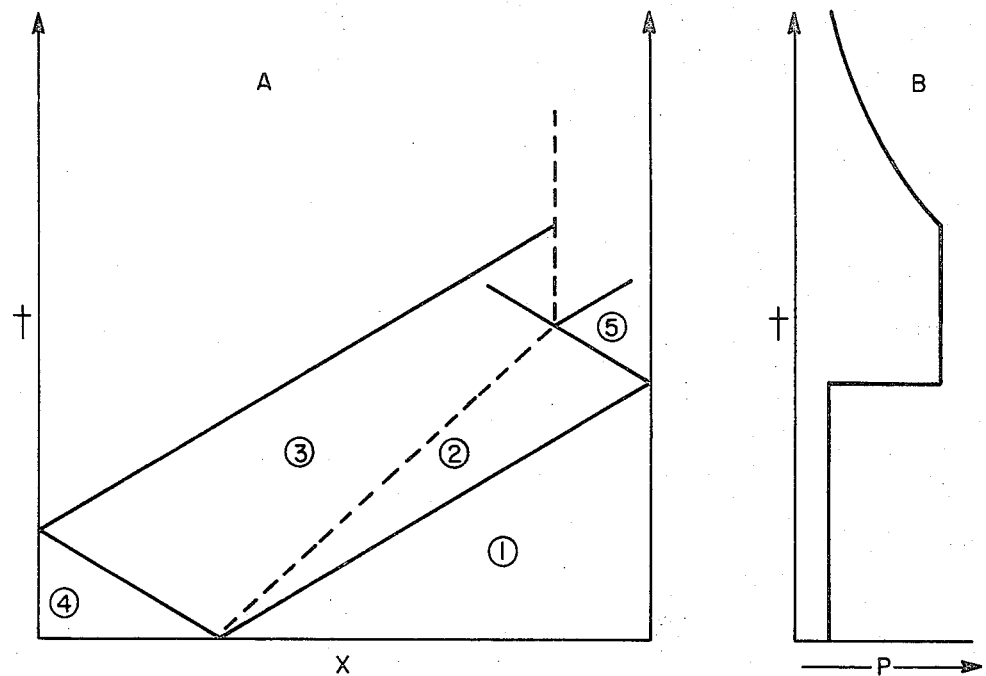
FIGURE 2
INVENTORS
JER-YU SHANG
WILLIAM B. HANSEL
BY
Barry A. Bisson
ATTORNEY

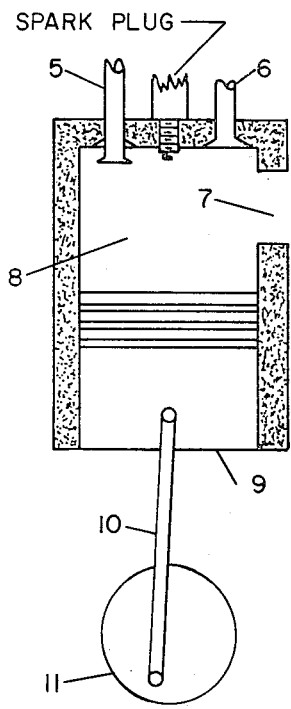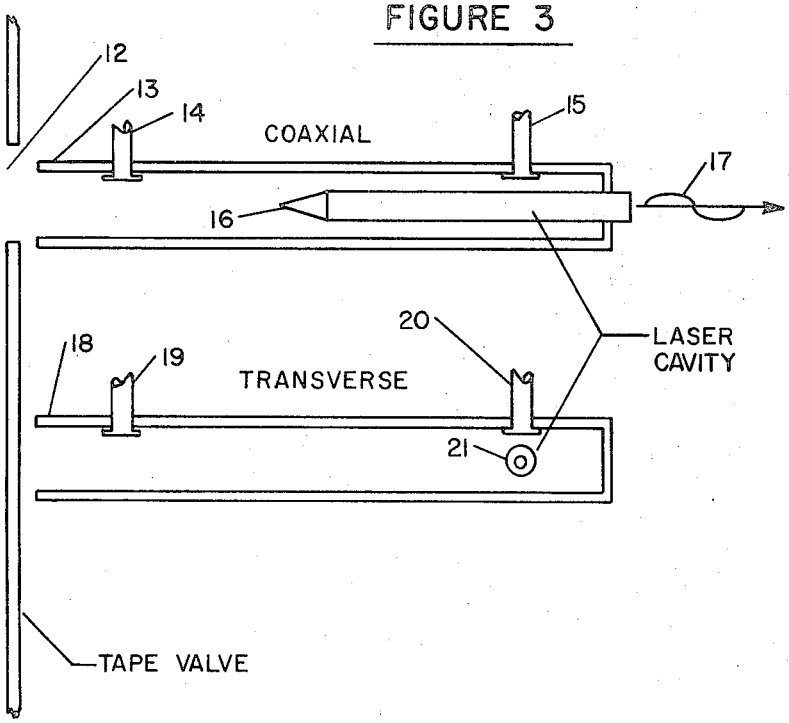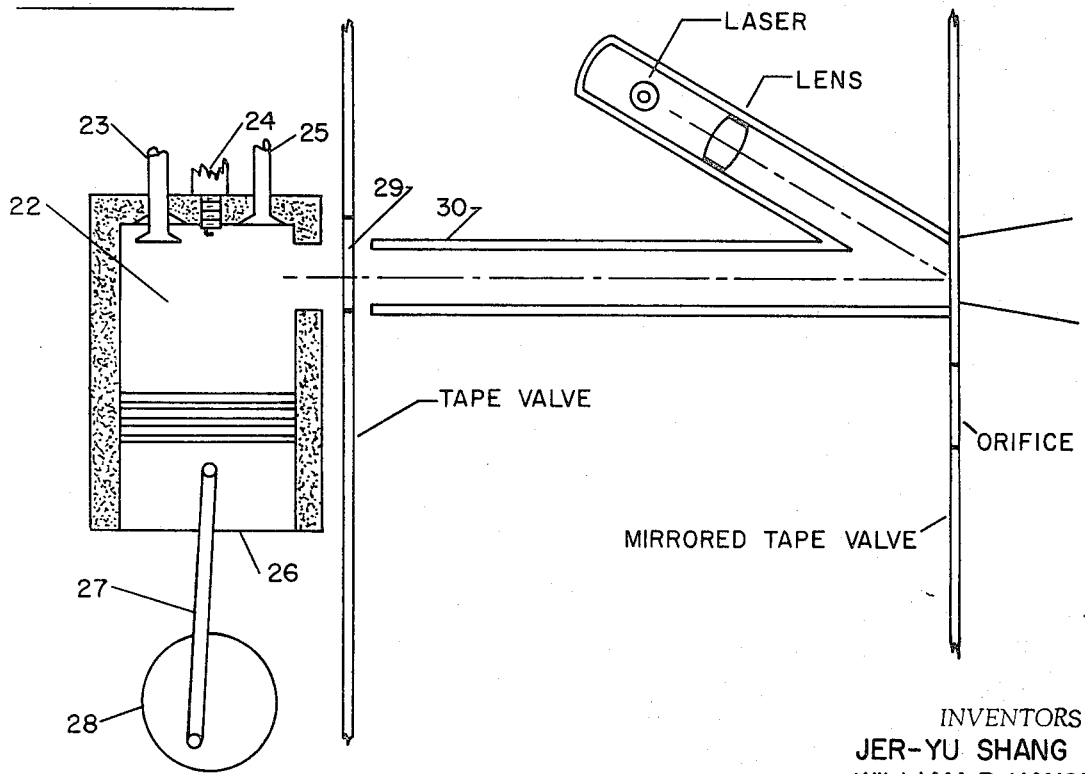

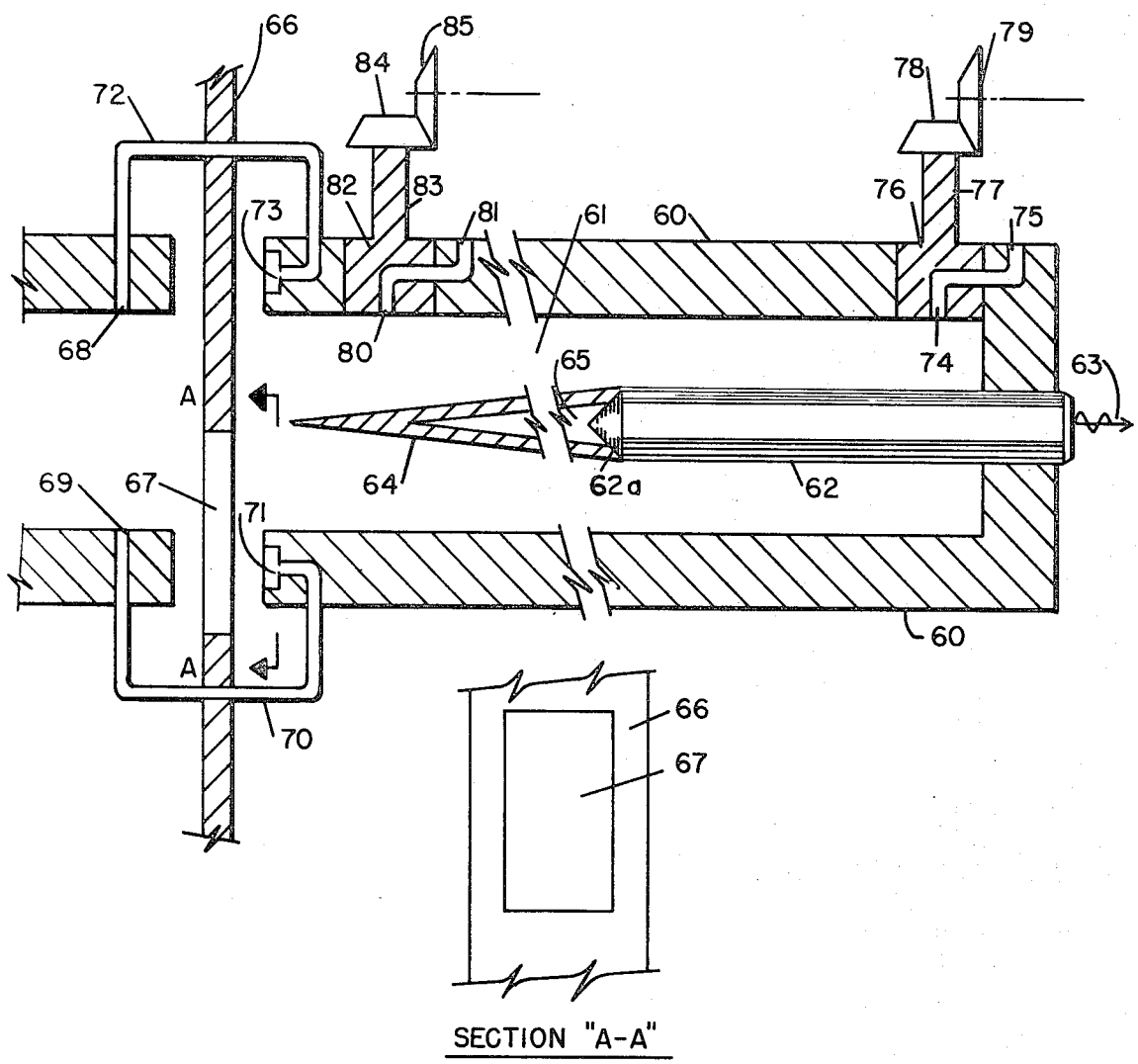

APPARATUS FOR IRRADIATION OF LASER CAVITY

CROSS REFERENCE TO RELATED APPLICATIONS

This application is a continuation-in-part of our application Ser. No. 3,964 filed Jan. 19, 1970, abandoned and is also related to Ser. No. 3,966 of Jer-Yu Shang, filed Jan. 19, 1970, now U.S. Pat. No. 3,719,454 issued Mar. 6, 1973. The disclosure of both of these applications is hereby incorporated herein.

BACKGROUND OF THE INVENTION

The maser or the laser can be used to cause the ejection of energy from an excited molecule. The frequencies from a maser or laser radiation can be electronically tuned to a finite range to excite certain portions of a given molecule and cause local excitation in a very short time interval. Then the excitation (vibrational and electronical) is transferred to another part of the molecule. This is known as relaxation phenomenon. Energy can be extracted from a reaction system by emitting the characteristic radiation from the final products in the form of laser or maser action. This has been demonstrated, for example, by Dr. Irwin Wieder in *Phys. Letters* 13, 759 (1967) (see also Chem. Eng. July 31, 1967 pp. 48, or *Chem. Eng. News* June 26, 1967). The Wieder device is operated by a technique called chemi-optical resonant pumping, whereby radiation from molecules newly formed in flames is absorbed by identical molecules physically separated from the combustion or reacting apparatus.

The Wieder device uses a tube of carbon dioxide gas in a laser cavity and radiation from a carbon monoxide flame. Continuous output power of 1 milliwatt of infrared energy is reported. The carbon dioxide is contained at 0.3 to 1.3 torr in a quartz tube 4 meters long. Mirrors at each end of the tube have a 99.5 percent reflectivity for light at 10.6 microns, the wave length of a carbon dioxide laser beam. On two sides of the tube, and extending the full length of it, is a series of burners fed with carbon monoxide.

When the carbon monoxide burns, carbon dioxide in a highly excited energy state results. Some of this energy radiates through the walls of the quartz tube to raise the entrapped carbon dioxide from the ground energy level to an excited state. Lasing results when photons are emitted from the excited carbon dioxide as it drops to a lower energy state. Another means of irradiation of a laser cavity is disclosed by DeMent in U.S. Pat. No. 3,414,838 and involves irradiation of a target (e.g., a laser cavity) with electromagnetic energy (e.g., light) by means of a combination of a shock producing light source aligned to strike a breakable reflective optic upon activation of the light source, wherein the breakable reflective optic is optically coupled to the light source and the irradiable target is optically coupled to the breakable optic, whereby to provide via the breakable optic a light-coupling between the target and the light source.

BRIEF DESCRIPTION OF THE INVENTION

The invention involves means for irradiation of a laser cavity and includes processes and apparatus. One embodiment is an apparatus comprising an irradiable target and means for the irradiation of said target with electromagnetic energies covering the region between approximately the infra-X-ray and the trans-infrared portions of the spectrum, said menas comprising: means for generating light and an associated shock wave front and a gas flow passage which is aligned so that said light and said shock wave front can strike said tape valve, said tape valve comprising a movable member having a mirror-like surface and also an aperture in spaced relation to said surface and means for moving said member at a speed such that said light strikes the mirror-like surface and said movable member to provide via said movable member a light-coupling between said target and light source, and wherein said tape valve comprises a tape impervious to said shock wave and at least one aperture in said tape and means for driving said tape at a high velocity between two aligned portions of said passage and for moving said tape transversely with respect to the length of said passage, said aperture which when moved into registry with said two aligned portions comprises the opening of said valve permitting communication between said aligned passage portions, and means for maintaining said tape centered in the gap between said aligned portions, as the tape moves, said means providing application of oppositely directed gas flows to the respective opposite faces of the tape.

In one preferred embodiment the apparatus includes critical flow orifices and means wherein said oppositely directed gas flows are produced within said critical flow orifices, thereby permitting equilization of the pressure on each side of said movable member and preventing contact of said movable member with said aligned portions.

In the present invention, energy at a given frequency is extracted from the luminosity associated with a shock front, (which can involve a chemical reaction such as combustion) by means of a laser cavity containing a material (solid, liquid or gas) which can be excited by the energy and caused to limit laser light (or quantized energy). The laser cavity can be incorporated in the interior portion of a wave reactor or within the combustion chamber of an internal combustion engine. The laser cavity can also be external to the combustion chamber. Thus, the laser cavity can be of the resonance or the pump types; however, the invention is usually of greater utility with a laser resonant cavity. The interior surface of the wave reactor or internal combustion engine should be highly reflective, such as a mirrored surface and can include means (e.g., wipers, brushes, gas jets, etc.) for maintaining part or all of said surface in a clean reflective condition.

The resulting laser light can be used for many applications, such as communication, machinery, weapons (see for example U.S. Pat. No. 3,414,838 for a listing of such applications.).

A laser cavity enclosed within a wave engine (or wave reactor) can be used to produce a rapidly pulsed laser beam by converting the luminosity associated with a shock wave front into laser light. An especially useful source of such mechanical energy for powering a wave engine is high pressure natural gas. In the wave engine mechanical energy (e.g., gas pressure) is transformed into light and heat energy. The wave engine is a "wave reactor" when this light and/or heat energy is used to trigger a desired chemical reaction.

The light associated with the combustion of fuel (including the luminosity associated with the shock front produced by the combustion) in an internal combustion engine can also be caused to produce laser light by incorporation of a laser cavity within the combustion chamber of the engine. More preferably, the laser cavity is external to the combustion chamber and the luminosity or light associated with the shock wave front is separated from the shock wave by means of a mirrored tape-valve and the so separated light is caused to irradiate the laser cavity (e.g., see FIG. 4). The shock wave can also be kept separate from the laser cavity by providing the wall of the combustion chamber with a light transmitting shock barrier (e.g., a quartz window); however, such a window suffers from the disadvantage that it can become fouled by impurities or additives in the feed (e.g., lead oxides) or by carbon produced by incomplete combustion of a hydrocarbon fuel.

When the shock wave generated in a continuous shock wave reactor is passed through a gas (e.g., argon, carbon dioxide, light hydrocarbon), the extreme compression of the gas in the shock front rapidly heats and excites (sometimes causing decomposition of the gas). This, in turn, causes intense light emission. This light (just as light from a flame or explosion) can be used to pump various lasers (with appropriate precautions so that the shock wave from the explosion does not shatter the laser itself).

There are a number of ways of arranging lasers inside a "continuous" shock wave reactor (or an internal combustion engine) such as forming a ring of lasers, imbedding a ring of lasers in the wall of the shock wave reactor or engine, etc. One arrangement is the concentric coaxial monolaser illustrated in FIG. 5 of the drawings.

Cynogen, CN, burning in oxygen generates an extremely energetic flame which can be used to pump ruby rods for brief periods (see C. S. Stokes and L. A. Streng "Investigation of Several High Temperature Reactions Involving Cyanogen and Like Compounds as High Brightness Chemical Pyrotechnic Sources," USGRDR. Mar. 10, 1969, Vol. 69, No. 5, p. 156, which was received by the U.S. Patent Office on June 6, 1969). Weak continuous wave (or CW) laser action on the 10.6 wave length $CO_2$ laser transition can also be excited by pumping the $CO_2$ gas with a surrounding flame from gas jets supplied with CO and $O_2$. If mixtures of cynogen/oxygen ($CN/O_2$), carbon monoxide/oxygen ($CO/O_2$), and light hydrocarbon vapors are subjected to shock wave compression in a continuous shock wave reactor, such as that as shown in FIG. 5, coherent laser radiation will result.

The present invention, in a preferred embodiment, utilizes a continuous shock wave generator, which is actuated by a fast opening-closing valve, such as the tape valve of W. B. Hansel's U.S. Pat. No. 3,500,862, issued Mar. 17, 1970 (the disclosure of which is incorporated herein by reference).

The Hansel tape valve is an impervious tape which is driven at a high velocity between two aligned portions of a gas flow passage, the tape moving transversely with respect to the length of the passage. The tape has an aperture therein which comes into registry with the two passage portions to permit communication therebetween for opening of the valve. The tape is maintained centered in a small gap between the juxtaposed passage portions, as the tape moves, by the application of (oppositely-acting) gas pressures to the respective opposite faces of the tape.

The basic principle of the tape valve involves the use of a number of critical flow orifices behind the tape, opposite to the high pressure side of the tape valve. These critical orifices generate sufficient back pressure to counterbalance the pressure from the high pressure side. The tape valve must have a self-acting servomechanism to keep the tape from coming unduly close to the sides, at the two sides of the tape. A mechanical valve mechanism syncronized with the tape can permit the reacted gases to escape and be collected as final products.

There are many natural gas wells in the western part of Texas. These wells generate high pressure gases which can be used as a mechanical energy source in the continuous shock wave reactor.

Be feeding oxygen into the wave reactor, the natural gas can be converted to useful products (such as ethene or propylene). Alternatively, fluorine gas can be fed into the wave reactor and caused (by the shock excitation) to react with the natural gas to produce fluorinated hydrocarbons and HF.

DESCRIPTION OF THE DRAWINGS

A laser is a device that converts different forms of energy into a concentrated beam of coherent electromagnetic radiation. When a system is in thermal equilibrium, most of the atoms occupy the lowest possible energy levels, i.e., they are in the "ground state". Atoms in the ground state can be excited to higher energy levels by pumping, i.e., by causing them to absorb energy from some external source. An atom in such an excited state may then relax to a lower energy state, known as the metastable state, by releasing some of the absorbed energy. A second energy release, wherein the material goes from the metastable state to the ground state is the energy which can be transformed to a laser beam. For such an energy transfer to result in a laser beam, it is necessary to have an active laser material, an optically resonant cavity, and means whereby external energy can excite the laser material. When sufficient energy is absorbed by the material, its energy characteristics change and it becomes an emitter of coherent electromagnetic radiation. For example, in a gas laser the output can be continuous and the discharge is made directly in the laser material.

Stimulated emission is the process which occurs when the light emitted from one atom interacts with another atom that is still in the excited state.

In the accompanying drawings FIG. 1 illustrates a combination of a laser with an internal combustion engine.

In FIG. 1 the engine has an intake valve 1, an exhaust valve 2 and a combustion chamber 3 where fuel-air mixture is ignited (as by a spark plug or by compression). Hydrocarbons (e.g., natural gas, gasoline or diesel fuel) are the usual fuels although other combustibles can be used (such as nitromethane, ethers, alcohols, ammonia, etc.). In this embodiment it is preferred that the laser be placed in the region behind the reflected shock wave. This region (designated by a circled 5 in FIG. 2) can be determined by a plot of time ($t$) v. distance ($x$) as illustrated in drawing A of FIG. 2. FIG. 2 also, in the lower drawing C, illustrates the three major areas encountered in a shock tube or wave reactor.

In A and C of FIG. 2, the circled 1 is the region in front of the shock front;

circled 2 signifies the region behind the shock front and before the interface;

circled 3 is the region behind the interface and the reflected expansion wave;

circled 4 signifies the region behind the expansion wave; and circled 5 is the region behind the reflected shock wave.

In the sole invention of Jer-Yu Shang (which is claimed in his co-pending application Ser. No. 3,966 filed of even date with our parent application Ser. No. 3,964) which combines a shock tube and a laser, the area of the shock tube behind the reflected shock wave is converted into a laser cavity. This is accomplished by mirroring two opposite sides of the interior of the shock tube in the area behind the reflected shock wave. One front-coated mirror is made partially transmitting for the desired wave length of laser light (e.g., 99.5 percent reflection); thus causing lasing of the excited gases in the region labeled with the circled 5 producing laser light which leaves the shock tube through the partially transmitting mirror. Also shown in FIG. 2 at sketch B on the far right is a plot of time ($t$) v. pressure (P) encountered in a wave reactor. This plot illustrates the appreciable and abrupt change in the pressure gradient which, along with supersonic flow phenomena, is characteristic of the shock process. The Shang combination can convert both collision energy and light into laser energy.

The mathematical relationships illustrated in FIG. 2 are discussed in detail in the following prior art publications:

SHOCK TUBES, J. K. Wright, Pages 29–31 (1961), Wiley & Sons Inc.

SHOCK WAVES IN CHEMISTRY AND PHYSICS, John N. Bradley, Pages 52–55 and 189–9, Wiley & Sons, N.Y.

CHEMICAL REACTIONS IN SHOCK WAVES, Edward F. Greene, and J. Peter Toennies, Pages 125–7 (1964), Academic Press Inc.

FUNDAMENTALS OF GAS DYNAMICS, Jerzy A. Owczarek, Pages 390–5 (1964), International Text Book Co., Scranton, Pa.

FIG. 3 illustrates two possible configurations of a laser which is exterior to the internal combustion engine, and which is excited by moving a tape valve such that light from the interior of the internal combustion engine passes through the orifice of the tape valve and irradiates the laser. Instead of a tape valve, the opening in the engine head can be sealed with a light-transmitting window (e.g., quartz). FIG. 3 illustrates two positions, relative to the light producing shock source (the internal combustion engine) in which the laser can be placed. In the upper configuration, the laser cavity is coaxial to the light-producing shock source (also illustrated is a replaceable protective nose cone 16). In the lower arrangement the laser cavity (21) is transverse to the light-producing shock source. In either arrangement it is preferred that the interior of the shock tube (13 and 18) and the interior of the combustion chamber 8 of the internal combustion engine be highly reflective (e.g., mirror-like). In FIG. 3 the shock tube containing the laser is provided with an intake valve (14 and 19) and an exhause valve (15 and 20). These valves allow chemical reactants, or excitable gases such as xenon or neon, to enter the shock tube, and be withdrawn, thus chemical products can be obtained or an expensive transfer agent (e.g., xenon) can be recovered and recycled. The internal combustion engine can be otherwise used in a conventional manner (e.g., the piston 9, via rod 10 can transmit power to a crank-shaft 11), to power a vehicle or drill, to generate electrical power, etc.

FIG. 4 illustrates a preferred embodiment of the present invention involving irradiation of an irradiable target (e.g., a laser cavity) with electromagnetic energies covering the region between approximately the infra-X-ray and the trans-infrared portions of the spectrum by means of the system which comprises: light associated with a shock wave front (e.g., produced within 22 an internal combustion engine) aligned to strike a movable member having a mirror-like surface and also an aperture (or orifice) in spaced relation to said surface (e.g., a mirrored tape valve) and means for moving said member at a speed such that said light strikes the mirror-like surface and said shock wave front passes through said aperture; an irradiable target (e.g., a laser) optically coupled to said mirror-like surface and said movable member, whereby to provide via said movable member a light-coupling between said target and light source. FIG. 4 also includes a second tape valve similar to that in FIG. 3, which can be used to regulate the passage of shock and light into the hollow conduit 30.

In FIGS. 5 and 6 there is illustrated a combination of a laser cavity and a wave reactor and/or wave engine. This invention can be used to produce a rapidly pulsed laser. That is, it can convert the mechanical energy of a shock wave into a laser light in a quasi continuous fashion. In FIG. 5, a shock tube 60 encloses a laser cavity 62 which contains a laserable material which can be a solid (e.g., ruby), liquid or gas (e.g., $CO_2$). In the wave engine a pressure differential exists on opposite sides of a metal tape 66. To the left of the tape is a source of higher pressure gases than on the right of the tape. Tape 66 moves at high speed (as by oscillation— but preferably is a continuous band, like a band-saw blade), such that the orifice A-A (shown in the section view of FIG. 6) alternately allows the high pressure gas on the left to enter the shock wave tube. For further description of the wave engine or wave reactor see U.S. Pat. No. 3,300,283 of Lauer et al., issued Jan. 24, 1967; U.S. Pat. No. 3,307,917 of Hansel et al., issued Mar. 7, 1967; U.S. Pat. No. 3,357,797 of Hansel, issued Dec. 12, 1967; U.S. Pat. No. 3,500,862 issued Mar. 17, 1970 of Hansel; U.S. Pat. No. 3,307,918 of Bodmer et al., issued Mar. 7, 1967; U.S. Pat. No. 3,355,256 of Hansel, issued Nov. 28, 1967; and U.S. Pat. No. 3,384,117 of Hansel, issued May 21, 1968.

Critical flow orifices 68 and 69 allow equilization of the pressure to the left such that gases emerging through ports 71 and 73 prevent the metal tape 66 from rubbing against the shock tube. The gases producing the shock wave, can be vented from the shock tube by a mechanically operated valve, such as the beveled gear system, 85 and 84, which activates a stop-cock type valve arrangement for venting of the driven gas. Similarly, the driven gas is vented through the stop-cock arrangement 74 and 75 which is activated by the beveled gear arrangement 78 and 79.

When the high pressure gas enters through the orifice A—A into the right-hand side of the chamber (the shock tube), an expansion wave meets a shock wave in the region between the ports 74 and 80. The region behind the reflected shock wave contains highly excited gases. These excited gases pass from the excited state to a metastable state and, in passing from the metastable state to ground state, produce radiation which causes lasing of the laserable material in the laser cavity 62 resulting in the production of a laser beam 63. Preferably the laser cavity (if the coaxial position illustrated in the drawing) is protected by a replaceable nose cone 64 or by arrangements described by Laderman et al., *Applied Optics*, Vol. 8, No. 8, 1743-5 (1969).

The size of the engine required to produce a desired amount of laser power can be determined as follows:
   a. calculate needed photon pumping flux,,
   b. calculate size and temperature of shock front having luminosity needed to provide pumping flux,
   c. calculate shock front parameters to give needed luminosity,
   d. calculate "engine" size to give the needed shock system.

Such calculation is applicable to both the internal combustion engine and to pressured gas sources as mechanical drivers for a wave reactor (or engine).

Where it is desired that a given chemical product be recovered from the wave reactor, such a product can be removed by means of the stop-cock type valve arrangement and vents 80, 81 or 74, 75. The combination of a laser cavity with a wave reactor can be used to produce laser radiation and desired chemical products (e.g., methane and nitrogen can be converted to hydrogen cyanide and acetylene by causing the reactants to be rapidly heated, by the shock source, to a temperature of 3500°F. or greater, followed almost immediately by cooling to 1600°F. or less, the cooling rate being in the same order of magnitude as the heating rate). The combination can be used as a source of heat energy and laser energy and can involve combustion of a hydrocarbon (e.g., gasoline plus oxygen) or any carbonaceous material, even carbon powder suspended in air.

The combination of an internal combustion engine or a wave engine and a laser cavity is particularly useful as a portable source of laser light, as for guidance in drilling wells or tunnels.

An additional and important utility which can be obtained by combining a laser cavity and a wave engine or wave reactor of the type illustrated in FIGS. 5 and 6, is in the field of long-range communication. That is, the rate of movement of the tape and the size and spacing of the openings in the tape can be utilized to control the amount and timing of the pulses of the laser energy emitted and, if this energy is directed at a suitable receptor (or reflector that is directed at a receptor) the amplitude, quantity and patterning of the pulses of laser energy can be translated by the receiver into a message.

In general, a preferred class of lasable materials comprises compounds of the following elements: Ag, Al, B, Ba, Be, C, Ca, Cd, Cr, Fe, Ge, Hg, Li, Mg, Mn, Na, Pb, Ru, Si, Sr, Ta, Ti, U, V, W, Zn and Zr. The device in U.S. Pat. No. 3,434,072 of M. Birnbaum, issued Mar. 18, 1969, can be utilized with these and additional elements as the laser portion of the claimed combination and others disclosed herein.

The invention claimed is:

1. An apparatus comprising an irradiable target and means for the irradiation of said target with electromagnetic energies covering the region between approximately the infra-X-ray and the trans-infrared portions of the spectrum, said means comprising: means for generating light and an associated shock wave front and a gas flow passage which is aligned so that said light and a shock wave front can strike said tape valve, said tape valve comprising a movable tape member having a mirror-like surface and also at least one aperture in said tape and means for moving said member at a speed such that said light strikes the mirror-like surface and said shock wave front passes through said aperture; and wherein said irradiable target is optically coupled to said mirror-like surface and said movable member to provide via said movable member a light-coupling between said target and light source, and wherein said movable member is impervious to said shock wave and wherein said moving means comprises means for driving said tape at a high velocity between two aligned portions of said passage and for moving said tape transversely with respect to the length of said passage, said aperture which when moved into registry with said two aligned portions comprises the opening of said valve permitting communication between said aligned passage portions, and means for maintaining said tape centered in the gap between said aligned portions, as the tape moves, said means providing application of oppositely directed gas flows to the respective opposite faces of the tape.

2. The combination of claim 1 wherein said system includes critical flow orifices and wherein said oppositely directed gas flows are produced within said critical flow orifices thereby permitting equilization of the pressure on each side of said movable member and preventing contact of said movable member with said aligned portions.

3. The combination of claim 1 wherein said light and said shock wave front are produced within an internal combustion engine.

4. The combination of claim 1 wherein means are included for introducing xenon into the region behind the reflected shock wave.

5. The combination of claim 1 wherein means are included for maintaining carbon dioxide in the laser cavity.

6. The combination of claim 1 wherein said light and shock wave front are produced within a wave reactor.

7. The combination of claim 6 wherein means are included for producing said shock wave front utilizing a gaseous hydrocarbon under high pressure.

8. The combination of claim 7 wherein means are included for causing said shock wave front to initiate a chemical reaction involving said hydrocarbon and at least one additional reagent.

* * * * *